Jan. 9, 1945. A. ARLEQUEEUW 2,366,994
LOOM TEMPLE
Filed Aug. 10, 1943
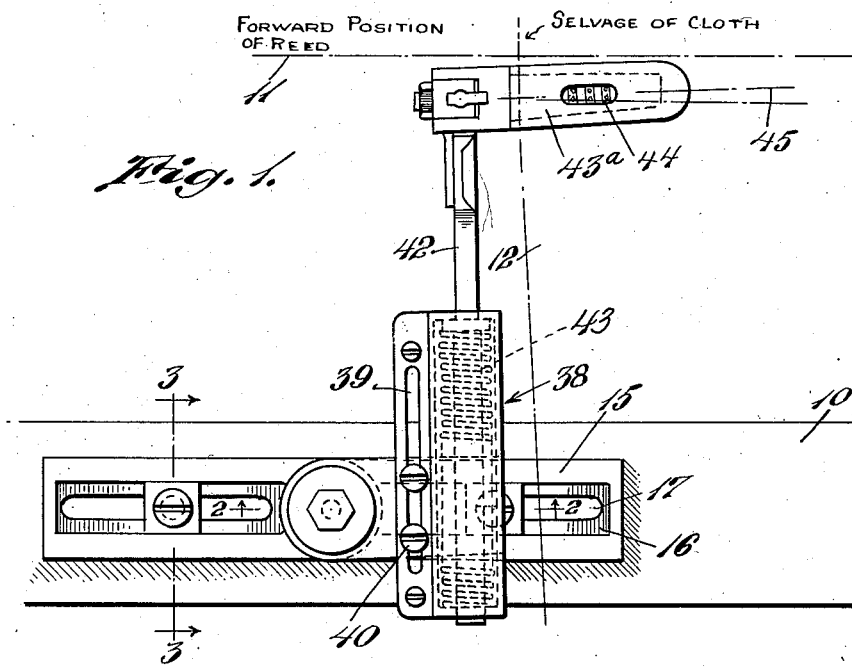
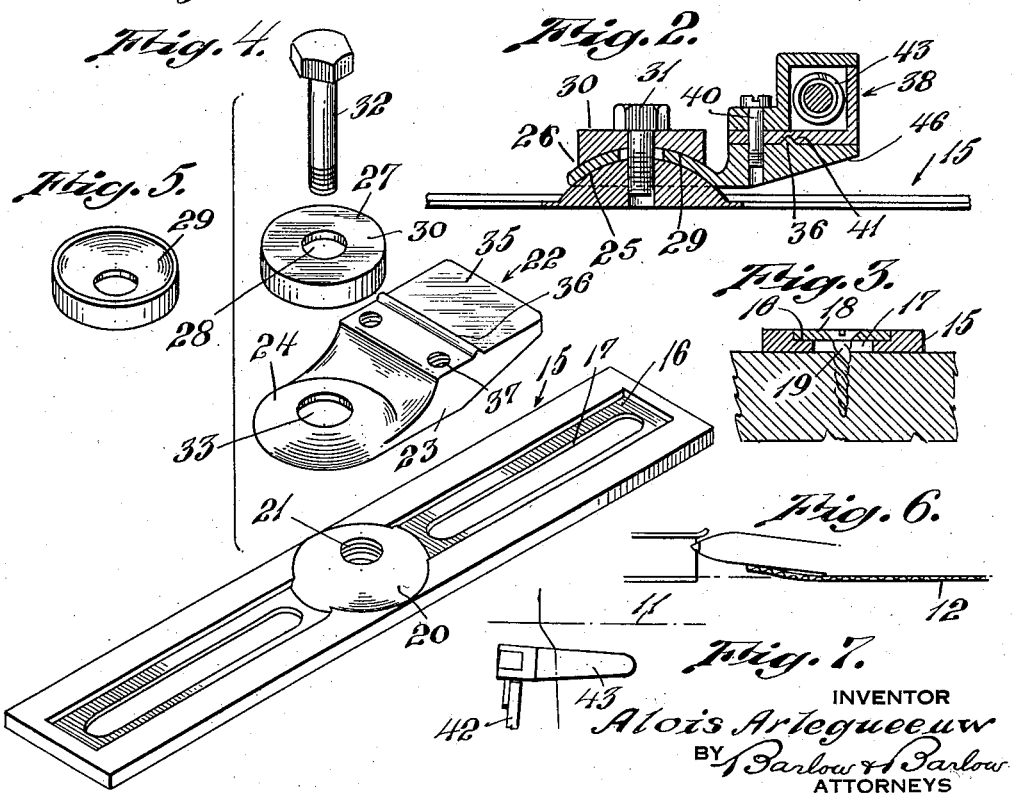
INVENTOR
Alois Arlequeeuw
BY Barlow & Barlow
ATTORNEYS Patented Jan. 9, 1945

2,366,994

UNITED STATES PATENT OFFICE 2,366,994

LOOM TEMPLE

Alois Arlequeeuw, Providence, R. I.

Application August 10, 1943, Serial No. 498,053

3 Claims. (Cl. 139—301)

This invention relates to a loom temple and more particularly to the mounting of the loom temple so that it will have the proper position in the loom.

In the mounting of a loom temple on the breast beam of a loom it is usual to provide some sort of a base plate which is secured to the breast beam and to then mount a suitable support for the temple roll on this plate. In order that the fabric maintain its proper alignment it is necessary that the temple roll be properly adjusted as to position, both for the purpose of directing the travel of the fabric in its own plane and also to maintain the correct horizontal position of the fabric. In order to maintain this proper position of the temple roll it has been customary to pack some spacing material between the base plate and the breast beam so as to change the plane of the plate to in turn change the axis of the temple roll. This packing may occur either along the front or back edge of the base plate or at one end of the other in order to change the plane of the base and in turn change the position of the axis or the temple roll. Such a matter of adjustment is painstaking and clumsy.

One of the objects of this invention is to provide a mounting for the temple roll support so that adjustment of the temple roll may take place without changing the base plate on the breast beam of the loom.

Another object of this invention is to provide a mounting for the support for the temple roll so that the position of this roll may be universally adjusted without changing the position of the base plate on the breast beam of the loom.

Another object of the invention is to provide for an adjustment of the base plate along the breast beam of the loom so as to differently space the temples which engage the opposite edges of the fabric.

Another object of the invention is to provide by means of adjustment of the temple an arrangement to reduce chafing of the cloth by reason of drawing in excessively after it leaves the reed.

Another object of the invention is to provide an adjustment of the temple roll so as to prevent skips of the shuttle as it passes between the warps.

Another object of the invention is to provide by reason of the adjustment of the temple roll an arrangement so that the shuttle will not strike the edge of its box and become chipped or damaged in use which occurs by reason of the lifting of the cloth out of the plane in which it is woven.

Another object of the invention is to provide a mounting which may be easily substituted for the present mounting of the supports for temple rolls while utilizing the main and more expensive part of the temple as a whole.

With these and other objects in view, the invention consists of certain novel features of construction, as will be more fully described and particularly pointed out in the appended claims.

In the accompanying drawing:

Fig. 1 is a top plan view illustrating the temple and its associated mechanism which enter into this invention;

Fig. 2 is a longitudinal section on line 2—2 of Fig. 1;

Fig. 3 is a transverse section on line 3—3 of Fig. 1;

Fig. 4 is a perspective exploded view of the base, the carrier member, the bolt and securing washer for holding the carrier member and base together;

Fig. 5 is a perspective view of the underside of the washer shown in Fig. 4;

Fig. 6 is a diagrammatic view illustrating the edge of the fabric as raised and deflecting the shuttle upwardly causing it to strike the edge of the box which situation my invention may overcome by adjustment of the temple;

Fig. 7 is a diagrammatic view illustrating a fault which may occur by reason of the shifting of the temple roll support about an axis perpendicular to the plane of the travel of the cloth which will cause chafing of the fabric.

In proceeding with this invention instead of fixedly supporting a base upon the breast beam and providing a track thereon along which a carrier member may slide for differently spacing loom temples at either side of the fabric I have provided a base plate which may be longitudinally adjustable across the breast beam of the loom for variously positioning the temples on either side of the loom to accommodate fabrics of different widths and have provided upon such adjustable base plate an arrangement for mounting the support for the temple roll so that the support may be universally adjusted to swing the roll axis perpendicular to the plane of the fabric as at a greater or lesser height with reference to the horizontal plane of the fabric or to incline the temple roll at an angle to the plane of the fabric or at an angle to the direction of travel of the fabric. This all being accomplished by means of a single clamping bolt which may hold the parts in adjusted position which it is desired that they shall assume.

With reference to the drawing 10 designates the breast beam of the loom while the dot dash line 11 indicates a position to which the lay may swing as the reed beats up each pick as inserted. The fabric is designated generally 12, one edge only being illustrated although a duplicate arrangement of opposite hand will be understood to cooperate therewith at the other edge of the fabric.

Upon the breast beam 10 I mount a base plate 15 which is recessed as at 16 and longitudinally slotted as at 17 through the bottom of this recess. A rectangular binding member 18 of a size to snugly fit the recess 16 is located therein with the wood screw 19 extending therethrough having a counter-sunk opening for the head of the screw 19 by which arrangement a smooth top surface across the base is provided so that the fabric may be drawn thereover without danger of abrading the fabric while the base plate may be firmly clamped in any desired position to be adjusted to a different position by loosening this clamping member and sliding the base plate 15 lengthwise of itself beneath these clamping rectangular members 18. This adjustment provides for positioning the temple rolls for fabrics of different widths.

At the center of the base plate 15 there is located a mound-like projection 20 which presents a convex surface generally conforming to the surface of a sphere, a threaded central opening 21 is located in this portion so that the axis of the opening is at right-angles to the general plane of the base.

A carrier member designated generally 22 (see Fig. 4) has a body portion 23 and a concavo-convex portion 24 providing an under concave portion 25 of a shape to fit the convex surface of the mound-like portion 20, both being on substantially the same radius whereby these surfaces may slide one over the other in close fitting relation. The upper part 26 is also convex and for convenience may follow an arc of curvature on a little greater radius than that of the concave surface 25 beneath. The binding washer 27 has a central opening 28 provided with an under surface 29 of a convex shape to fit the surface 26 while its upper surface 30 is flat to be engaged by the under portion of the head 31 of a binding bolt 32 which extends through the opening 28 of the washer, through a larger opening 33 in the carrier member 22 and into the threaded opening 21 in the mound portion 20 of the base. While the openings 28 and 21 fit the bolt 32 the opening 33 in the carrier is much larger as illustrated in Fig. 2 which enables this carrier to be slid about the spherical surface of the base and beneath the washer so that adjustment may occur in any one of a multiplicity of planes passing through the axis of the bolt 32 as a center while at the same time this carrier may be swung around this bolt as a pivot axis at right angles to the axis of the bolt which arrangement provides for swinging in three different planes at right angles to each other for adjustment of the carrier with reference to the base.

The carrier member 22 is provided with a mounting surface 35 having a rib 36 and bolt holes 37 to receive the casing 38 which has a groove 41 to receive the rib and a slot 39 through which bolts 40 extend into the holes 37 to adjustably mount the casing in position on the mounting surface 35. This casing may be adjusted at right angles to the general extent of the base and along the rib 36 by loosening the bolts 40.

Within the casing 38 the temple bar 42 is resiliently mounted by means of springs 43 which permit some yielding motion to occur by reason of the bar 42 sliding into the casing in a known manner.

An arcuate shell 43a is carried by the bar 42 while beneath it the temple rolls 44 are mounted to each pivot about an axis which is at an angle to the general plane of the fabric. The rolls are each provided with small pins to engage the cloth so as to hold the same against slipping inwardly and at the same time drawing the cloth outwardly to maintain it at substantially the full reed width until after it passes beyond the temples and approaches the breast beam of the loom, being substantially narrower as this crosses the breast beam 10.

The carrier member 22 is provided with an inclined flaring under surface 46 which will enable the fabric to pass beneath it as it travels over the breast beam.

Should wear occur on the casing or temple bar the fabric may lift at its edge as shown in Fig. 6 and cause the shuttle to be lifted so that it will strike the edge of the box. This will be corrected by tilting the carrier member 22 to lower the temple rolls. When the casing so wears as to permit lateral play of the bar 42 in the plane of the fabric, an adjustment may be needed of the carrier member 22 by tilting it around an axis parallel to the slot 17 so as to raise or lower bar 42 at its outer end. Other adjustments because of wear may take place about the axis of the bolt 32 as a pivot.

By this arrangement it will be readily apparent that the temple roll may be substantially universally adjusted by its axis being shifted in any one of the three planes at right angles to each other, all by means of loosening one bolt, positioning the temple roll as desired and then tightening this bolt. Simplicity is thus very readily apparent and the common fault which usually comes from misalignment of the temple rolls may be cured without changing the base or packing one or the other edges thereof and without shifting the base unless it becomes necessary to make a change for a different width cloth.

I claim:

1. A loom temple having in combination, a base, a carrier member, said base and member being provided with interfitting convex and concave surfaces corresponding to portions of the surface of a sphere of substantially the same radius to enable one to slidably move about the other in a multiplicity of directions, the convex surface part being provided with a threaded hole, a binding bolt therein with a clamping washer beneath its head, the concave surface part being provided with an opening through which said bolt extends and of a diameter to permit rocking of the parts in different directions and a temple roll and support therefor mounted on said member whereby adjustment in different planes may be had by manipulation of said bolt.

2. A loom temple having in combination, a base provided with a raised support having a surface corresponding to a portion of a sphere and a threaded opening extending centrally thereof, a carrier member having a portion thereof provided with a concave surface corresponding substantially to the same radius as that of the surface of said support and in contact therewith and slidably movable about said support in a multiplicity of directions, a binding bolt in said threaded opening, a clamping washer between the head of said bolt and said carrier member, said concave surface having an opening through which said bolt extends and of a diameter to permit rocking of the parts in different directions and a temple roll and support therefor mounted on said member whereby adjustment in different planes may be had by relative movement of said carrier member on said support.

3. A loom temple having in combination, a base having a centrally disposed raised support provided with a surface corresponding to a portion of a sphere and having a threaded opening extending centrally thereof, a carrier member having a concavo-convex portion and with the concave surface corresponding substantially to the same radius as that of the surface of said support in contact therewith and slidably movable about said support in a multiplicity of directions, a clamping washer having a concave surface corresponding substantially to the convex portion of said carrier and resting thereon, a bolt in said threaded opening extending through said washer and said concavo-convex portion for binding said parts to each other, said concavo-convex portion having an opening through which said bolt extends and of a diameter to permit locking of the concavo-convex portion on said support when said bolt is loosened, and a temple roll and support therefor mounted on said member whereby adjustment in different planes may be had by relative movement of said carrier member on said support.

ALOIS ARLEQUEEUW.